(12) United States Patent
Chuang et al.

(10) Patent No.: US 12,061,120 B2
(45) Date of Patent: Aug. 13, 2024

(54) FLOATING BRIDGE STRUCTURE AND INFRARED SENSING DEVICE

(71) Applicant: HON HAI PRECISION INDUSTRY CO., LTD., New Taipei (TW)

(72) Inventors: Shang-Yu Chuang, Hsinchu County (TW); Kuang-Hao Chiang, Taoyuan (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/936,382

(22) Filed: Sep. 28, 2022

(65) Prior Publication Data

US 2023/0127926 A1  Apr. 27, 2023

(30) Foreign Application Priority Data

Oct. 27, 2021 (TW) ................... 110212658

(51) Int. Cl.
*G01J 5/02* (2022.01)
*G01J 5/08* (2022.01)
*G01J 5/20* (2006.01)

(52) U.S. Cl.
CPC ........... *G01J 5/0205* (2013.01); *G01J 5/0815* (2013.01); *G01J 5/20* (2013.01)

(58) Field of Classification Search
CPC .......... G01J 5/0205; G01J 5/0815; G01J 5/20; G01J 5/023; Y02P 70/50
See application file for complete search history.

(56) References Cited

U.S. PATENT DOCUMENTS

| 5,831,266 | A | * | 11/1998 | Jerominek | ................ | G01J 5/20 257/E31.127 |
| 2006/0131501 | A1 | | 6/2006 | Ikushima et al. | | |
| 2013/0026592 | A1 | * | 1/2013 | Lapadatu | ............ | H01L 27/1467 438/69 |
| 2017/0110498 | A1 | * | 4/2017 | Dale | ......................... | G01J 5/20 |
| 2021/0293627 | A1 | * | 9/2021 | Kurth | ......................... | G01J 5/20 |

FOREIGN PATENT DOCUMENTS

TW  I824423 B * 12/2023 ................ G01J 5/02

* cited by examiner

*Primary Examiner* — Edwin C Gunberg
*Assistant Examiner* — Gisselle M Gutierrez
(74) *Attorney, Agent, or Firm* — CKC & Partners Co., LLC

(57) ABSTRACT

A floating bridge structure includes a substrate, a floating bridge layer, and at least one support. The floating bridge layer is on the substrate and substantially parallel to an upper surface of the substrate. The support extends on a vertical surface from the substrate to the floating bridge layer, in which the vertical surface is substantially perpendicular to the upper surface of the substrate.

20 Claims, 3 Drawing Sheets

FLOATING BRIDGE STRUCTURE AND INFRARED SENSING DEVICE

CROSS-REFERENCE TO RELATED APPLICATION

This application claims priority to Taiwan Application Serial Number 110212658, filed Oct. 27, 2021, which is herein incorporated by reference.

BACKGROUND

Field of Invention

The present disclosure relates to a floating bridge structure and an infrared sensing device including the floating bridge structure.

Description of Related Art

In general, an uncooled infrared sensing device can convert far-infrared radiation emitted by a target due to blackbody radiation into electrical signals, so as to sense the target accordingly. However, as the pixel size becomes smaller and smaller, the current uncooled infrared sensing device often has a problem that the light absorption area of the sensing unit is too small, resulting in a decrease in the ability to collect infrared rays. Based on the above, how to increase the effective light absorption area of a single sensing unit in an infrared sensing device and at the same time retain the high thermal insulation and low resistance characteristics of the support of the sensing unit in the infrared sensing device is an important issue in this field.

SUMMARY

According to some embodiments of the present disclosure, a floating bridge structure includes a substrate, a floating bridge layer, and at least one support. The floating bridge layer is on the substrate and substantially parallel to an upper surface of the substrate. The support extends on a vertical surface from the substrate to the floating bridge layer, in which the vertical surface is substantially perpendicular to the upper surface of the substrate.

In some embodiments of the present disclosure, the support extends from a sidewall of the substrate to a sidewall of the floating bridge layer.

In some embodiments of the present disclosure, the support has at least one bending portion.

In some embodiments of the present disclosure, a number of the support is two, and the two supports are disposed opposite to each other.

In some embodiments of the present disclosure, when an extension length of the support on the vertical surface is between 20 μm and 100 μm, a cross-sectional area of the support is between 1 μm² and 15 μm².

In some embodiments of the present disclosure, the support and the floating bridge layer are integrally formed as one piece.

According to some embodiments of the present disclosure, an infrared sensing device includes the aforementioned floating bridge structure, at least one light absorption layer, and at least one thermistor layer. The light absorption layer and the thermistor layer are stacked on the floating bridge structure.

In some embodiments of the present disclosure, a vertical distance between the floating bridge layer and the substrate is between 0.2 times and 0.3 times a wavelength of the infrared ray.

In some embodiments of the present disclosure, a number of the light absorption layer and a number of the thermistor layer are respectively plural, and the light absorption layers and the thermistor layers are alternately stacked with each other.

In some embodiments of the present disclosure, a vertical projecting area of the floating bridge layer on the substrate is equal to an effective light absorption area of the infrared sensing device.

In some embodiments of the present disclosure, a vertical projecting area of the light absorption layer on the substrate is equal to an area of the upper surface of the substrate.

In some embodiments of the present disclosure, a vertical projecting area of the thermistor layer on the substrate is equal to an area of the upper surface of the substrate.

In some embodiments of the present disclosure, the support has a plurality of bending portions, and the bending portions are aligned with each other.

In some embodiments of the present disclosure, a material of the support includes silicon nitride.

In some embodiments of the present disclosure, a material of the light absorbing layer includes silicon nitride, and a material of the thermistor layer includes vanadium oxide.

According to the aforementioned embodiments of the present disclosure, since the floating bridge structure of the present disclosure has the support with a special space design, the effective light absorption area of the infrared sensing device can be increased. In detail, since the support is disposed between the substrate and the floating bridge layer, the support does not occupy the extension space of the floating bridge layer, thereby increasing the effective light absorption area and improving the sensing capability. On the other hand, since the plane on which the support is located and the plane on which the floating bridge layer is located are perpendicular to each other, more stable support can be provided, such that the entire floating bridge structure is more stable in structure.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
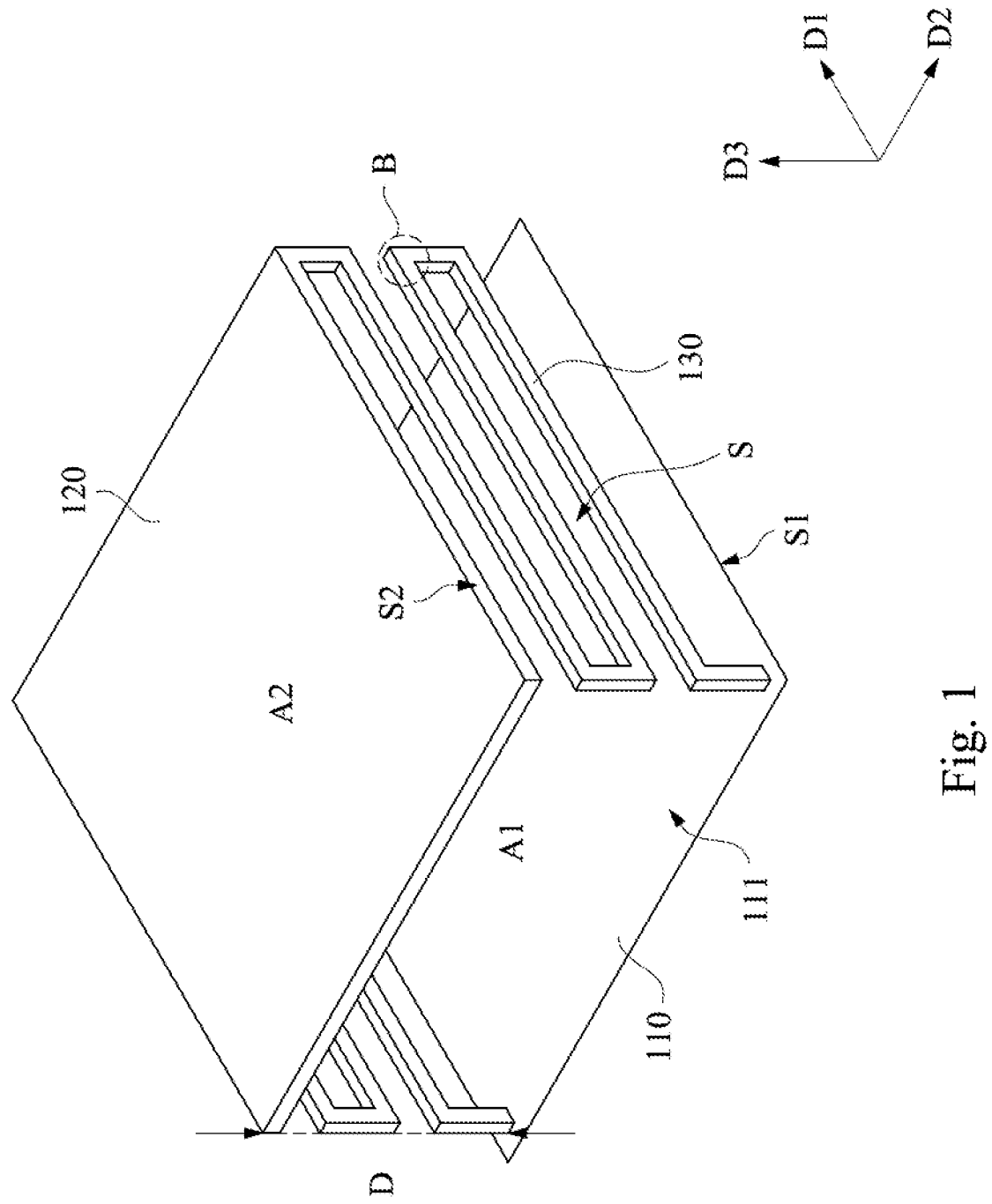
FIG. 1 is a schematic three-dimensional view of a floating bridge structure in an infrared sensing device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It should be understood that relative terms such as "lower" or "bottom" and "upper" or "top" can be used herein to describe the relationship between one element and another element, as shown in the figure. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

The present disclosure provides an infrared sensing device including at least one floating bridge structure. The special design of the support in the floating bridge structure can not only increase the effective light absorption area of the infrared sensing device, but also maintain the high thermal insulation properties of the infrared sensing device, thereby improving the overall sensing capability of the infrared sensing device. Specifically, the infrared sensing device of the present disclosure may be, for example, an uncooled infrared sensing device.

Reference is made to FIG. 1, which is a schematic three-dimensional view of a floating bridge structure 100 in an infrared sensing device according to some embodiments of the present disclosure. It should be understood that the infrared sensing device may include a plurality of floating bridge structures 100, and the floating bridge structures 100 may be connected to each other and arranged in an array. However, for clarity and convenience of description, FIG. 1 only shows one floating bridge structure 100 as an example. The floating bridge structure 100 in the infrared sensing device includes a substrate 110, a floating bridge layer 120, and at least one support 130. The substrate 110 extends on a horizontal plane formed by a first direction D1 and a second direction D2, that is, an upper surface 111 of the substrate 110 is parallel to the horizontal plane, in which the first direction D1 and the second direction D2 are perpendicular to each other. In some embodiments, the substrate 110 may be, for example, an integrated circuit silicon substrate configured to readout electrical signals.

The floating bridge layer 120 is disposed on the substrate 110 and extends parallel to the horizontal plane (i.e., extends parallel to the upper surface 111 of the substrate 110), and the floating bridge layer 120 and the substrate 110 do not contact each other, that is, there is a substantial space S between the floating bridge layer 120 and the substrate 110, thereby ensuring that heat can only be conducted through the elongated support 130, such that the heat energy is not easily dissipated rapidly. In some embodiments, in order to ensure that the floating bridge structure 100 achieves good thermal insulation properties, the entire floating bridge structure 100 may be packaged by a vacuum packaging technology. That is, in the space S between the floating bridge layer 120 and the substrate 110, there is substantially no medium that can conduct heat except for the support 130. In some embodiments, a light absorption layer (not shown in FIG. 1) and a thermistor layer (not shown in FIG. 1) in contact with each other may be disposed on the floating bridge layer 120. The light absorption layer is configured to absorb infrared rays (i.e., infrared radiation energy) to change the resistance of the thermistor layer, and the substrate 110 can further convert the resistance change into a voltage change to generate electrical signals for subsequent readout. The arrangement of the light absorption layer and the thermistor layer will be further described later and in FIG. 3. In some embodiments, a material of the floating bridge layer 120 may include, for example, silicon nitride ($Si_3N_4$), but the present disclosure is not limited thereto.

In some embodiments, an area A2 of the floating bridge layer 120 on the horizontal plane formed by the first direction D1 and the second direction D2 (the area A2 can also be regarded as an vertical projecting area of the floating bridge layer 120 on the substrate 110) is equal to the effective light absorption area of the entire infrared sensing device (in the case where the number of the floating bridge structure in the infrared sensing device is one), and the area A2 of the floating bridge layer 120 may be equal to the area A1 of the substrate 110 located therebelow on the horizontal plane. With the above arrangement, the effective light absorption area of the infrared sensing device can be effectively increased, thereby improving the sensing capability. In some embodiments, a vertical distance D between the floating bridge layer 120 and the substrate 110 may be between 0.2 times to 0.3 times, and preferably 0.25 times, the wavelength of the infrared rays absorbed by the infrared sensing device, such that the space S between the floating bridge layer 120 and the substrate 110 forms an optimal resonance cavity. In some embodiments, the wavelength of the infrared rays absorbed by the infrared sensing device of the present disclosure may be between 9 μm and 14 μm.

Figure 2:
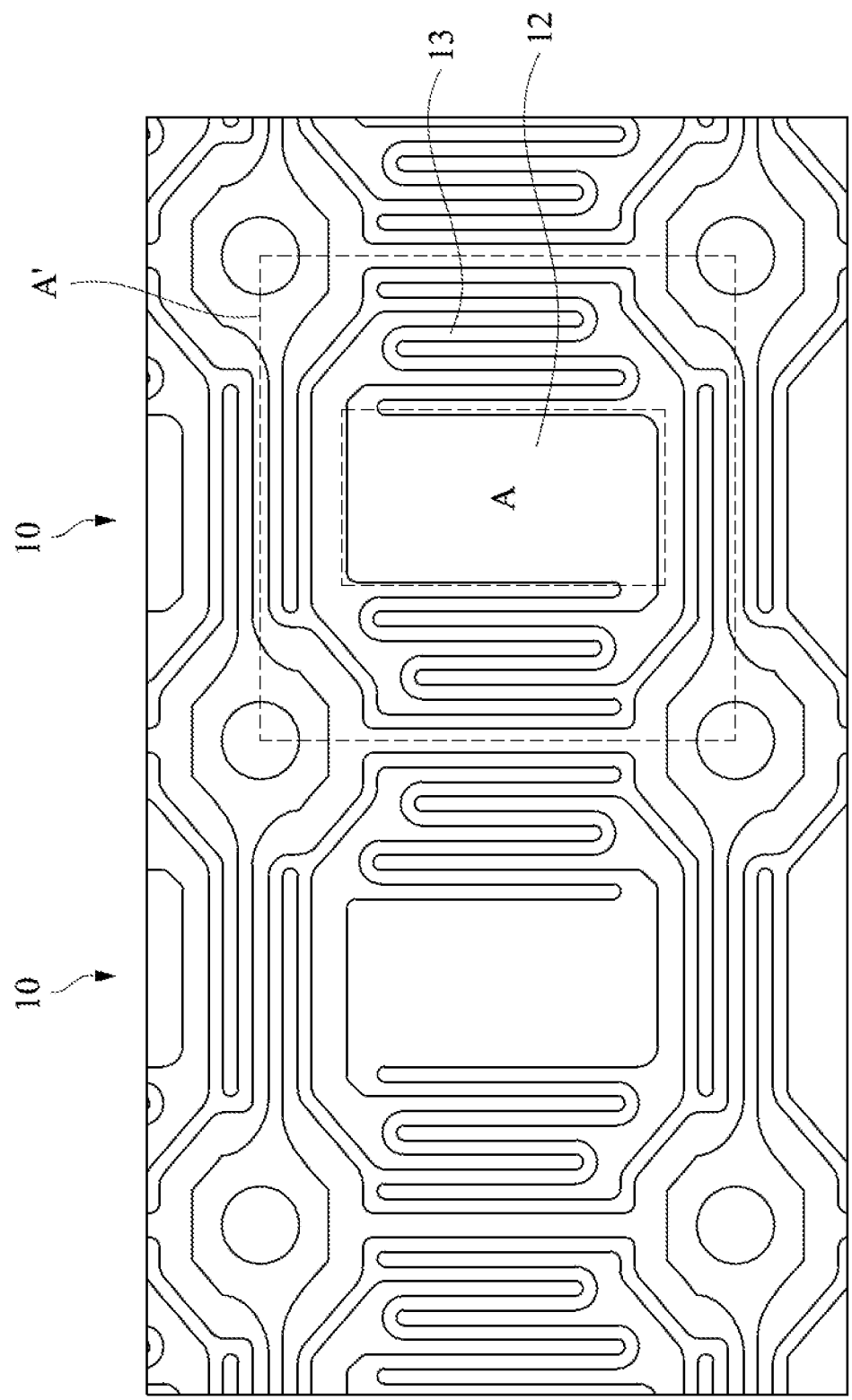
FIG. 2 is a schematic top view of two floating bridge structures in an infrared sensing device of a comparative example.

The support 130 connects the substrate 110 and the floating bridge layer 120, and extends from the substrate 110 to the floating bridge layer 120 on a vertical plane formed by the first direction D1 and a third direction D3 or formed by the second direction D2 and the third direction D3, in which the first direction D1, the second direction D2, and the third direction D3 are perpendicular to each other. In other words, the angle between the horizontal plane where the floating bridge layer 120 and the substrate 110 are located and the vertical plane where the support 130 is located is 90 degrees. In some embodiments, the support 130 extends from a sidewall S1 of the substrate 110 to a sidewall S2 of the floating bridge layer 120. In some preferred embodiments, the top view shapes of the substrate 110 and the floating bridge layer 120 are respectively quadrilateral, and the support 130 extends from one side of the quadrilateral of the substrate 110 (i.e., the sidewall S1) to one side of the quadrilateral of the floating bridge layer 120 (i.e., the sidewall S2). Based on the above, the support 130 is disposed on the edges of the substrate 110 and the floating bridge layer 120. In some embodiments, the number of the support 130 is even, and every two supports 130 are disposed opposite to each other. For example, the number of the support 130 can be two, and the two supports 130 are disposed opposite to each other (as shown in FIG. 1). As another example, when the top-view shapes of the substrate 110 and the floating bridge layer 120 are quadrilaterals, the number of the support 130 can be four, and the four supports 130 are respectively disposed on the four sides of the quadrilateral. In this way, the support 130 can provide more stable support, such that the entire floating bridge structure 100 can be more stable. On the other hand, since the support 130 does not occupy the position where the floating bridge layer 120 is disposed, the overall effective light absorption area of the floating bridge structure 100 can be increased, thereby enhancing the sensing capability of the infrared sensing device. Reference is made to FIG. 2, which is a schematic top view of two floating bridge structures in an infrared sensing device of a comparative example. Since the support 13 and the floating bridge layer 12 in the floating bridge structure 10 of the comparative example are disposed on the same plane, the effective light absorption area A of the floating bridge structure 10 is smaller than the pixel area A', thereby the space cannot be effectively utilized. Please return to FIG. 1. In some embodiments, a material of the support 130 may include, for example, silicon nitride, and the support 130 and the floating bridge layer 120 may be integrally formed as one piece, for example (e.g., both are molded from the same material in a same process), and there is essentially no interface between the support 130 and the floating bridge layer 120. In some embodiments, the support 130 may include a center wire and a dielectric layer covering the center wire.

On the other hand, in order to ensure that the support 130 has high thermal insulation properties, the support 130 can be designed to have at least one bending portion B. In detail, since the actual extension length of the support 130 (that is, the length of the path actually passed by the support 130) must be long enough to achieve a good thermal insulation effect, the support 130 is bent at least once in a limited space to ensure that the support 130 has a sufficient extension length. In some embodiments, the support 130 extends on the aforementioned vertical plane, and an extension length of the support 130 may be between 20 µm and 100 µm. More specifically, when the extension length of the support 130 is less than 20 µm, the thermal insulation effect of the support 130 may be poor; and when the extension length of the bracket 130 is greater than 100 µm, the support 130 cannot have low resistance characteristics. In some embodiments, the support 130 may have a plurality of bending portions B to better achieve thermal insulation. For example, the support 130 may be a paperclip-like structure. As another example, the support 130 may have a plurality of bending portions B bent in different directions (e.g., upward, downward, left, right, upper left, lower left, upper right, lower right, etc.). It should be understood that no matter how many bending portions B the support 130 has, and regardless of the bending direction of the bending portions B, as long as the support 130 has at least one bending portion B, it falls within the scope of the present disclosure.

In addition, in order to ensure that the support 130 has low resistance characteristics, the support 130 can be designed to have a suitable cross-sectional area. In some embodiments, the cross-sectional area of the support 130 may be between 1 µm$^2$ and 15 µm$^2$. More specifically, when the cross-sectional area of the support 130 is less than 1 µm$^2$, the support 130 cannot have low resistance; and when the cross-sectional area of the support 130 is greater than 15 µm$^2$, the support 130 cannot achieve good thermal insulation effect. Based on the design of the support 130 above, it can be known that the support 130 needs to have a suitable extension length and a suitable cross-sectional area at the same time, so as to provide both high thermal insulation properties and low resistance properties. With this design, the support 130 can satisfy both high thermal insulation properties and low resistance properties. In some embodiments, the support 130 may have a quadrangular cross-sectional shape (as shown in FIG. 1). However, the cross-sectional shape of the support 130 is not intended to limit the present disclosure. In some other embodiments, the support 130 may also have a circle, an ellipse, a triangle, a trapezoid, a polygon, a regular/irregular shape, or combinations of any of the above shapes.

Figure 3:
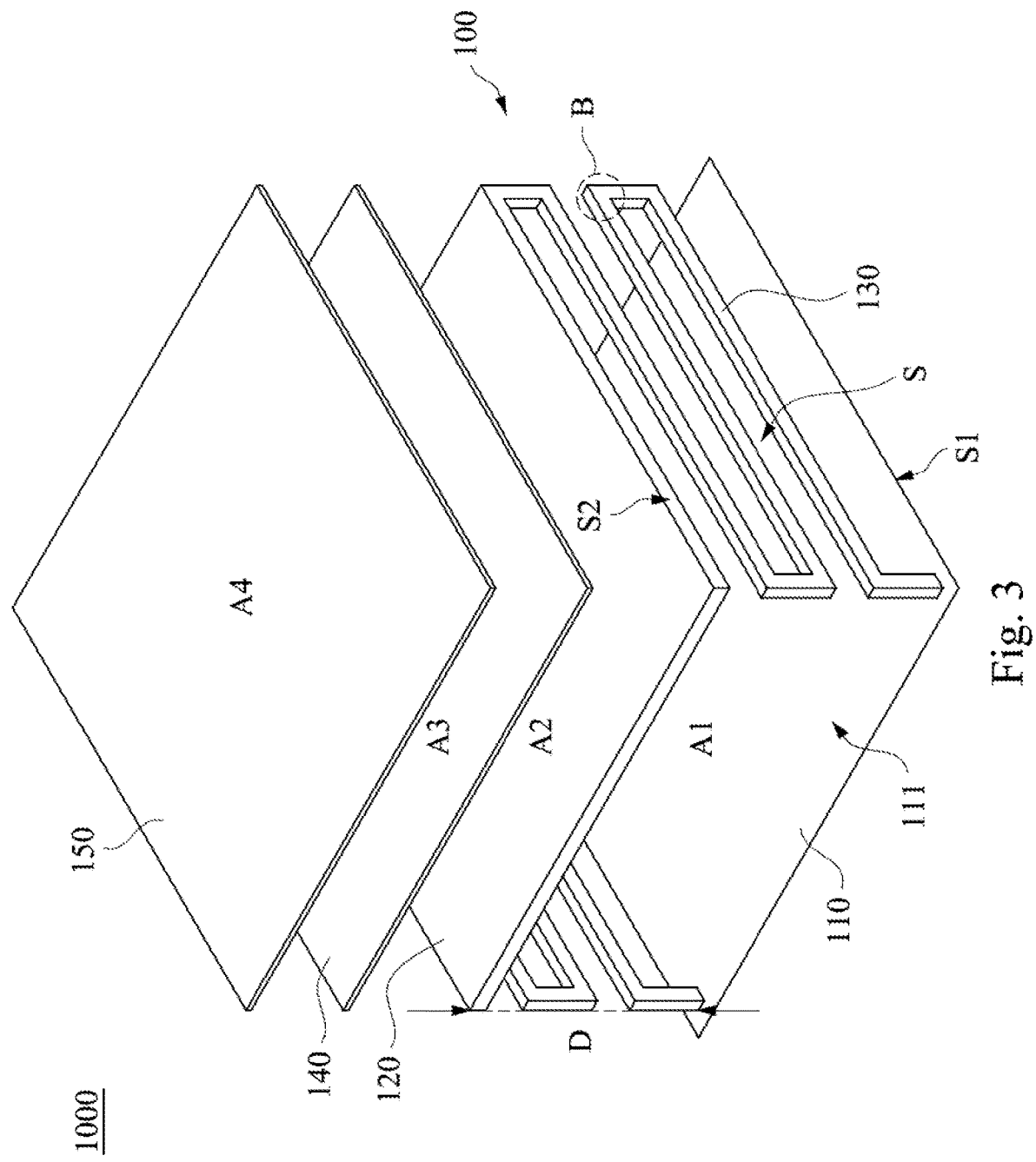
FIG. 3 is a schematic three-dimensional view of an infrared sensing device according to some embodiments of the present disclosure.

Reference is made to FIG. 3, which is a schematic three-dimensional view of an infrared sensing device 1000 according to some embodiments of the present disclosure. The infrared sensing device 1000 in FIG. 3 includes a floating bridge structure 100, a light absorption layer 140, and a thermistor layer 150. In some embodiments, the light absorption layer 140 and the thermistor layer 150 are stacked on the floating bridge layer 120 of the floating bridge structure 100, and the light absorption layer 140 and the floating bridge layer 120 sandwich the thermistor layer 150. In some embodiments, an area A3 of the light absorbing layer 140 on the plane parallel to the aforementioned horizontal plane and an area A4 of the thermistor layer 150 on the plane parallel to the aforementioned horizontal plane are each equal to the area A2 of the floating bridge layer 120 on the plane parallel to the aforementioned horizontal plane. In this way, the effective light absorption area of the infrared sensing device 1000 can be increased, thereby better utilizing the space and improving the sensing capability of the infrared sensing device 1000. In some embodiments, a material of the light absorbing layer 140 may include, for example, silicon nitride, which is an ideal infrared absorbing material; and a material of the thermistor layer 150 may include, for example, vanadium oxide ($VO_x$), which is more sensitive to heat, thereby producing a sufficient amount of resistance change. In some embodiments, the infrared sensing device 1000 may include a plurality of light absorption layers 140 and a plurality of thermistor layers 150, and the light absorption layers 140 and the thermistor layers 150 are alternately stacked on the floating bridge layer 120. However, the respective numbers and stacking manners of the light absorbing layers 140 and the thermistor layers 150 are not intended to limit the present disclosure.

According to the aforementioned embodiments of the present disclosure, since the floating bridge structure of the present disclosure has the support with a special space design, the effective light absorption area of the infrared sensing device can be increased. In detail, since the support is disposed between the substrate and the floating bridge layer, the support does not occupy the extension space of the floating bridge layer, thereby increasing the effective light absorption area and improving the sensing capability. On the other hand, since the plane on which the support is located and the plane on which the floating bridge layer is located are perpendicular to each other, more stable support can be provided, such that the entire floating bridge structure is more stable in structure. In addition, by configuring the support to have a suitable extension length and cross-sectional area, the support can have both high thermal insulation and low resistance properties.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:
1. A floating bridge structure, comprising:
  a substrate;
  a floating bridge layer on the substrate and substantially parallel to an upper surface of the substrate; and
  at least one support extending on a vertical surface from the substrate to the floating bridge layer, wherein the vertical surface is substantially perpendicular to the upper surface of the substrate, and a vertical projection of the support on the substrate entirely overlaps a vertical projection of a sidewall of the floating bridge layer on the substrate.

2. The floating bridge structure of claim 1, wherein the support extends from a sidewall of the substrate to a sidewall of the floating bridge layer.

3. The floating bridge structure of claim 1, wherein the support has at least one bending portion.

4. The floating bridge structure of claim 1, wherein a number of the support is two, and the two supports are disposed opposite to each other.

5. The floating bridge structure of claim 1, wherein when an extension length of the support on the vertical surface is between 20 μm and 100 μm, a cross-sectional area of the support is between 1 μm$^2$ and 15 μm$^2$.

6. The floating bridge structure of claim 1, wherein the support and the floating bridge layer are integrally formed as one piece.

7. An infrared sensing device, comprising:
a floating bridge structure comprising:
a substrate;
a floating bridge layer on the substrate and substantially parallel to an upper surface of the substrate; and
at least one support extending from the substrate to the floating bridge layer on a vertical surface, wherein the vertical surface is substantially perpendicular to the upper surface of the substrate;
at least one light absorption layer; and
at least one thermistor layer, wherein the light absorption layer and the thermistor layer are stacked on the floating bridge structure, and a vertical projection of the support on the substrate entirely overlaps a vertical projection of a sidewall of the floating bridge layer on the substrate.

8. The infrared sensing device of claim 7, wherein a vertical distance between the floating bridge layer and the substrate is between 0.2 times and 0.3 times a wavelength of an infrared ray.

9. The infrared sensing device of claim 7, wherein a number of the light absorption layer and a number of the thermistor layer are respectively plural, and the light absorption layers and the thermistor layers are alternately stacked with each other.

10. The infrared sensing device of claim 7, wherein a vertical projecting area of the floating bridge layer on the substrate is equal to an effective light absorption area of the infrared sensing device.

11. The infrared sensing device of claim 7, wherein the support extends from a sidewall of the substrate to a sidewall of the floating bridge layer.

12. The infrared sensing device of claim 7, wherein the support has at least one bending portion.

13. The infrared sensing device of claim 7, wherein a number of the support is two, and the two supports are disposed opposite to each other.

14. The infrared sensing device of claim 7, wherein when an extension length of the support on the vertical surface is between 20 μm and 100 μm, a cross-sectional area of the support is between 1 μm$^2$ and 15 μm$^2$.

15. The infrared sensing device of claim 7, wherein the support and the floating bridge layer are integrally formed as one piece.

16. The infrared sensing device of claim 7, wherein a vertical projecting area of the light absorption layer on the substrate is equal to an area of the upper surface of the substrate.

17. The infrared sensing device of claim 7, wherein a vertical projecting area of the thermistor layer on the substrate is equal to an area of the upper surface of the substrate.

18. The infrared sensing device of claim 7, wherein the support has a plurality of bending portions, and the bending portions are aligned with each other.

19. The infrared sensing device of claim 7, wherein a material of the support comprises silicon nitride.

20. The infrared sensing device of claim 7, wherein a material of the light absorbing layer comprises silicon nitride, and a material of the thermistor layer comprises vanadium oxide.

* * * * *